June 10, 1969      F. NETTEL      3,448,580
PEAK OUTPUT PRODUCTION IN STEAM TURBINE PLANTS
Filed Feb. 8, 1968
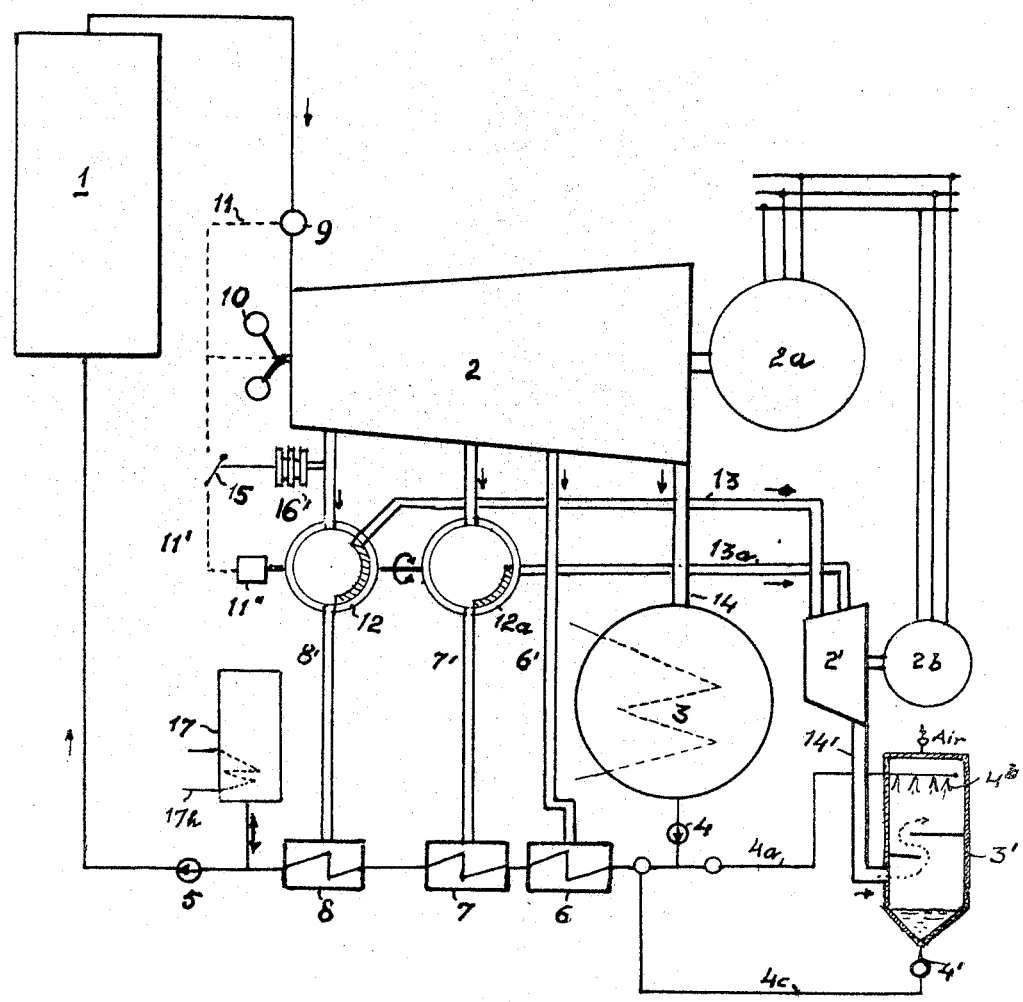
Frederick Nettel
INVENTOR.

United States Patent Office 3,448,580
Patented June 10, 1969

3,448,580
PEAK OUTPUT PRODUCTION IN STEAM
TURBINE PLANTS
Frederick Nettel, 173 Chapel Road,
Manhasset, N.Y. 11030
Continuation-in-part of application Ser. No. 698,035,
Jan. 15, 1968. This application Feb. 8, 1968, Ser.
No. 704,053
Int. Cl. F01k 7/16, 19/00
U.S. Cl. 60—67                                    3 Claims

ABSTRACT OF THE DISCLOSURE

A steam power plant for producing and controlling peak outputs, comprising a steam producer (boiler or reactor), a first multi-stage turbine with surface-type condenser and multi-stage extraction for regenerative feedwater heating, a second steam turbine with jet-type mixing condenser receiving steam from one (or more) extraction stages of the first turbine while using condensate from the first turbine as cooling water in the jet condenser. A first governor controlling the first turbine by varying the steam flow at its inlet when working in the range from zero to rated load, a second governor operative only when the sum output from both turbines exceeds the rated output of the first turbine, when the steam flow at the entrance to the first turbine is kept constant at its rated value, while the second governor varies the steam flow to the second turbine, therefore its output, and simultaneously varies the steam flow to the feedwater heater connected to the same extraction point, so that the steam extraction from the first turbine at this point remains unchanged over the whole combined turbine output range of both turbines, and also the output of the steam producer remains at its rated value.

---

This application is a continuation-in-part of my copending application Ser. No. 698,035, dated Jan. 15, 1968.

My invention is applicable to turbines utilizing regenerative feedwater heating for which purpose steam is extracted at one or more intermediate pressure turbine stages and condensed in a feedwater heater or heaters to heat the turbine condensate on its way back to the steam producer. For the purposes of this specification the term "steam producer" includes steam boilers of any type burning fossil fuels of any kind, as well as nuclear reactors moderated or unmoderated, in particular also fast breeder reactors irrespective of cooling medium utilized. Known means to operate plants at overloads include bypassing of the first (governor) turbine stage and/or provision of peaking power units such as Diesel- or gas turbine sets or very simple steam boiler-turbine sets kept in stand-by running condition.

Overload capacities of modern high-pressure steam boilers (mostly once-through boilers) and of large turbines fed by them is very limited which also limits the use of bypassing the governor stage. The other means are very expensive and inefficient. Their use was sometimes justified in the past when plant outputs were small by today's sizes and the number of generators operating in parallel in one system (grid) limited. Today, with individual turbine outputs of 200 to 1000 m.w., and grid outputs of 2000 m.w. or more, peak performance must be measured in percent of grid output, preferably 10 percent or more, and to be practical, must involve only moderate additional investments, while furnishing peak outputs automatically and instantaneously.

It is the basic purpose of this invention to solve the problem handling peak loads in a novel and simple manner. How this and other and further objects are achieved will become clear from the following specification when taken together with the drawings forming part of it, and showing diagrammatically embodiments of my invention by way of simple schematic non-limiting examples.

In the single drawing, a plant is shown with three feedwater heaters and valves for automatically controlling the steam flow at outputs above rated outputs.

It is known in the art to produce peak outputs in existing steam turbine power plants by reducing steam extraction from intermediate turbine stages, mostly manually, leading the steam no more extracted through the low pressure turbine stages.

This can be effective in condensing turbines to increase outputs up to around five percent. This arrangement requires substantial increases in steam flow through the low pressure part of the turbine. In very large turbines working at high vacuum the specific steam volume increases very rapidly in the lowest pressure stages requiring blade lengths approaching the mechanically possible limits. Reactors are generally not suited to furnish overloads.

This invention solves the problem without change in the steam producer (boiler or reactor) and without change at all in the main steam turbine by adding a second simple medium-pressure condensing turbine of few stages capable of producing the output above the rated main turbine output. This second turbine, which may be coupled with the main turbine, receives regulatably steam branched off the connecting pipe between the main turbine and preferably one or more of the highest-pressure feedwater heaters. Steam is bypassed at different pressure points into the second turbine when the total plant output exceeds rated output. This is done in such manner that the additional output needed is supplied by the second turbine. The two turbines may also share a common generator.

Obviously, such bypassing does not involve change in the steam output from the steam producer nor of the steam flow through the main turbine. The only effect will be a reduction in the feedwater end-temperature at the point where it enters the steam producer. This reduction will appear only slowly due to the great heat capacitance of the steel masses of the steam producer and thus does not affect the capacity of the plant to furnish the desired short-time peak outputs. Longer lasting peak outputs can be managed by slowly increasing the heat input into the steam producer via the conventional slower responding combustion control or other means, or by providing an accumulator tank for hot feedwater as will be described hereinafter. Plant heat economy is only slightly affected because the efficiency of the steam producer and the main turbine remain high. The second turbine handles only the kw. above rated plant output during relatively short peak performance, so that it can be of simple and cheap design (few stages). The cutting off of one or two feedwater heaters temporarily, increases heat consumption per kw.h. by not more than one or two percent in modern plants operating mostly with five to eight feedwater heaters.

Actually, the second turbine represents a "spinning" power reserve the output of which gradually rises from zero as the plant output exceeds the rated output of the main turbine. The no-load losses in the second turbine can be reduced by keeping it connected to its condenser. Since all its stages are then rotating in high vacuum, losses are minimal and blade overheating is avoided.

At peak outputs of the plant more steam flows into the condenser or condensers slightly reducing the vacuum, which is of no significance economically. The electric generator means, which may be separate for the two turbines, have to be rated to meet output requirements. Where both turbines drive a single generator, a rating increase can be obtained cheaply by temporarily increasing the pressure of the hydrogen cooling usually provided.

My invention can also be applied to plants in which the main turbine operates with steam reheat, in which case steam extraction and bypassing can take place preferably at or near reheat pressure.

It is within the scope of this invention to use the second turbine for starting the main turbine from standstill by feeding into it steam of suitable pressure from an available source, for example, another main turbine. It can also be used for driving auxiliary pumps such as feedwater pumps, etc.

Reverting now in more detail to the single drawing which shows diagrammatically a simple embodiment of my invention.

In the drawing, 1 is the steam producer (boiler or reactor), 2 the first (main) steam turbine, 2a the electric generator or other consumer of energy, 3 the main surface condenser, 4 the condensate pump, 5 the boiler feed pump. Interposed in the pipe between the condensate pump and the boiler feed pump are the feedwater heaters 6, 7 and 8, the latter being fed with extraction steam from the turbine via the pipes 6', 7' and 8'. 9 are the live steam valves controlling the steam volume at turbine entrance, 10 is the governor driven from the turbine shaft, 11 is an impulse line between 9 and 10 active during operation of the turbine between no-load and rated load, 12 and 12a are two rotary valves in pipes 8' and 7', respectively, the operation of which will be described as this specification proceeds.

2' is a second turbine arranged on a separate shaft and coupled with its generator 2b. The inlet of 2' is connected by the pipes 13 and 13a to the valves 12 and 12a as shown. 2' discharges steam into the jet-type mixing condenser 3' via the pipe 14'. Condensate from 3 can be pumped via 4 either into 6 or through the pipe 4a into the jet condenser 3'. 4a has spray nozzles 4b at its end as shown. The main condensate from 3 is used to condense the steam from turbine 2' by direct contact as known per se, with the mixture of the two condensates pumped back into 6 via the pipe 4c. The valves 12 and 12a in the position shown keep the pipes 8' and 7' connected to the heaters 8 and 7 while they shut off steam exit through the pipes 13 and 13a; valves 12 and 12a receive impulses to rotate via the impulse line 11' and the servomotor 11". This impulse line is shown in the drawing interrupted by the switch 15. The latter is closed automatically by the elastic bellows 16 connected to the pipe 8' when the stage pressure at the extraction point 8' reaches or exceeds a value corresponding to rated output of the turbine 2.

It is within the scope of my invention to use a surface condenser for the turbine 2' as well as condense with condensate from the turbine 2. But such condenser is more difficult to operate and maintain and, more importantly, it is much more expensive. Besides, the mixing condenser makes a simple recovery of the latent heat in the exhaust steam from 2' possible. 2' may be equipped with a conventional speed-limiting emergency governor (not shown). The valves 12 and 12a act in fact as second governor for the turbine 2', operative only in the total plant output range above the rated output of turbine 2 as follows: at outputs up to the rated output of turbine 2 the governor 10, via the impulse line 11, opens or closes the steam admission valves 9 in the same way as usual in conventional plants. When the required total plant output exceeds said output, the valves 9 remain fully open while the switch 15 closes. With the servomotor now in action it moves, when more output is required, the valves 12 and 12a in clockwise direction, thereby throttling steam flow into the heater 8 and opening the bypass lines 13 and 13a, allowing steam to enter the turbine 2', enabling it to produce additional power. If power requirements drop, these valves move in opposite direction, closing the bypass lines 13 and 13a somewhat while opening the inlet to heater 8 more. Obviously, plant output operation is fully controlled also for the range up to maximum peak output, part of which is supplied by the turbine 2'.

It is important to note that my invention permits operation above rated output of 2 while the output of the steam producer 1 remains constant, and what is equally important, also the steam flow through all stages of the turbine 2 remains unchanged.

As mentioned before, peak output performance can continue for some time before the feedwater temperature at the inlet to the steam producer will begin to drop. If, however, peak output is required for longer time periods, this can be achieved by adding a mixing-type feedwater heater-accumulator 17. It is interposed between the outlet from 8 and the boiler feedwater pump 5 as shown. This accumulator of predetermined capacity is normally filled with condensate and may be supplied with heating steam from the steam producer. Details of the control of this accumulator do not form part of this invention.

Where power plants serve a grid (group of power plants) it is of economic importance to properly decide when and how much peak capacity should be added to conform with growth of the grid.

This invention simplifies this problem because the boiler-turbine-generators per se need not be materially changed except for the addition of the mentioned rotary valves and some medium-pressure pipe connections. To any main set, and operating without the turbines 2', these may be added at any time later. Subsequent addition of turbines 2' need not create design problems.

If it is desired to continue overload operation for longer periods of time to cover daily or even seasonal requirements, it is within the scope of my invention to insert in the feedwater line, for example between the last preheater and the steam producer, an extra heater. Such may also be inserted in the accumulator 17, marked 17h in the drawing, fed from any auxiliary heat source such as oil, gas, etc.

Obviously, the cost of the equipment needed to convert an existing boiler-turbine-generator according to my invention to peak output capability is comparatively low, even for the largest units as compared with known other means. My invention is also applicable to mobile plants, for example, for ship propulsion.

What I claim is.

1. In the method of peak output production and regulation in steam power plants comprising a steam producer, a first multi-stage steam turbine in operational connection with said steam producer and power consuming means, said turbine equipped with steam extraction points at intermediate stages, said first turbine having first governor means for regulating output between no-load and rated load by varying the steam flow between the steam producer and said turbine, multiple feedwater heaters connected to said extraction points for regenerative preheating the feedwater on its way back to the steam producer, condenser means in operational connection with said first turbine, a second turbine with mixing-type condenser disposed to receive steam from a steam extraction point of said first turbine and to discharge it after expansion into said mixing condenser means and for driving a power consumer, a second governor for said second turbine for regulating its output while the said first turbine is operating at rated output, by regulating the steam flow from said first turbine into said second turbine, the steps,
while the sum of the outputs of both turbines is higher than the rated output of said first turbine, to keep the steam flow from the producer to said first turbine constant at its rated value while varying automatically the steam flow from said first into second turbine in response to impulses from said second governor, increasing it for required total output increases, and decreasing it for required output decreases so that the output of said second turbine drops to zero if the total required plant output drops to the rated output of said first turbine, so that required temporary total outputs above the rated output of said first turbine can be met practically instantaneously without substantial changes of the output of the the steam producer and of the steam flow through said first turbine, and leading condensate from said first condenser into the mixing condenser to serve therein as cooling water and returning the latter to the feedwater circuit of the first turbine.

2. In a steam power plant capable of producing and regulating required temporary peak outputs, the combination comprising a steam producer, a first multi-stage steam turbine in operational connection with said steam producer, said turbine being equipped with steam extraction points at intermediate pressure stages, a first surface-type steam condenser connected to said turbine, multiple feedwater heaters connected to said turbine by multiple first valved pipe means, for regeneratively preheating the feedwater on its way back to the steam producer, a first governor for regulating the output of said first turbine between no-load and a predetermined output, by automatically varying the steam flow at the turbine inlet, as known per se, a second condensing steam turbine with mixing-type condenser disposed to receive steam through pipe means from a steam extraction point of the said first turbine and for discharging it after expansion into the mixing-type condenser of the second turbine, said latter being coupled with a power consumer, a second governor including said multiple first valved pipe means for said second turbine operative only when the required total turbine output from both turbines is higher than the rated output of said first output, disposed to increase the steam flow into the second turbine automatically for required total output increases, while reducing correspondingly the steam flow from the pipe from which the second turbine is fed to the feedwater heater also connected to it, so that required sudden peak outputs above the rated output of said first turbine can be met practically instantaneously without substantial changes in the output (steam quantity, pressure and temperature) from the steam producer and without changes in the steam flow through said first turbine, pipe means for leading condensate from said first surface condenser into said mixing-type condenser for use therein as condensing medium, and pipe means to return said condensate together with the additional condensate formed in the mixing condenser back to the feedwater circuit of said first turbine.

3. In a steam power plant as set forth in claim 2, having the second turbine receiving steam from at least two extraction points of different pressures of the first turbine.

References Cited
UNITED STATES PATENTS

| | | | |
|---|---|---|---|
| 3,083,536 | 4/1963 | Vogler | 60—67 |
| 3,108,938 | 10/1963 | Nettel et al. | 60—73 X |
| 3,175,953 | 3/1965 | Nettel et al. | |

CARROLL B. DORITY, Jr., *Primary Examiner.*

U.S. Cl. X.R.

60—70, 95, 107